Patented Mar. 18, 1930

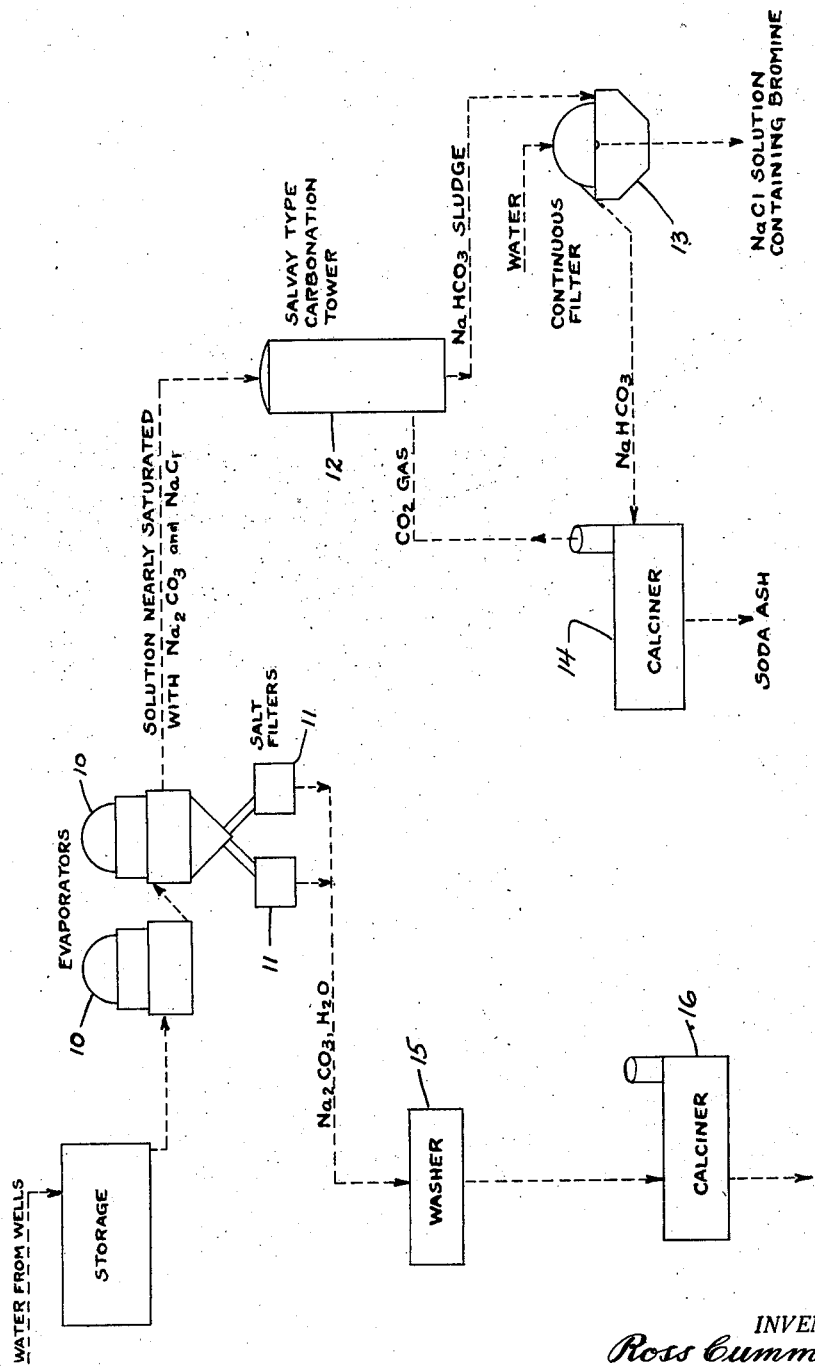

1,751,132

UNITED STATES PATENT OFFICE

ROSS CUMMINGS, OF BERKELEY, CALIFORNIA, ASSIGNOR TO ROBERT D. PIKE, OF PIEDMONT, CALIFORNIA

PRODUCTION OF ALKALI FROM NATURAL BRINE

Application filed December 14, 1927. Serial No. 239,892.

My present invention relates to a process for the production of alkali from natural brines. The object of my invention is to provide a means to obtain a high recovery of commercially pure alkali from a natural soda brine occurring at Green River, Wyoming. This brine has great potential commercial value which has not hitherto been realizable because of unsolved technical difficulties in the way of obtaining high yields from it of alkali in commercially valuable form.

A typical analysis of the brine follows:

| | |
|---|---|
| Specific gravity | 1.100 |
| $K_2O$ | .075 |
| $Na_2O$ | 6.74 |
| Chloride as NaCl | 2.32 |
| Carbonate as $Na_2CO_3$ | 8.30 |
| Bicarbonate as $NaHCO_3$ | .71 |
| Sulfide as $Na_2S$ | .177 |
| Sulfate as $Na_2SO_4$ | .041 |
| Total solids | 11.05 |
| Bromine | 200 parts per million |
| Iodine | 9 parts per million |

Caustic soda can be produced from this water in well known manner by direct causticization with lime, concentrating in salting out evaporators, and then rendering to caustic in the regular form of caustic pot; but such a procedure is not satisfactory because the bromides and traces of other impurities go with the caustic, thus reducing its purity and wasting a valuable by-product, namely, bromine. Another well known method of treating the brine is to concentrate to about a third of its original weight and then to cool, when a crop of crystals of pure sal-soda is formed. This process is unsatisfactory because it only recovers about fifty percent of the alkali in the brine, and this can ony be done in cold weather. The process is inoperative in the summer, also the product, i. e., sal soda, is not a highly valuable form of alkali.

By my process a high yield of pure alkali is obtained in satisfactory commercial form.

For a better understanding of my invention, reference should be had to the accompanying drawing, wherein I have diagrammatically illustrated the various steps of my process in their proper sequence.

In carrying out my invention, the soda water is first evaporated by artificial evaporation in salting out evaporators 10 arranged for salting out sodium carbonate mono hydrate at a temperature of or approximating the boiling point of water, i. e. 212° Fahrenheit. In these evaporators, which may be of any suitable well known design, as for example, double effect, 86% of the water in the original brine is evaporated, and about 44% of the total $Na_2O$ existing in the original brine as carbonate and bicarbonate is salted out by filters 11 as sodium carbonate mono hydrate. The mother liquor is nearly saturated with $Na_2CO_3$ and NaCl and has about the following composition:

| | Per cent |
|---|---|
| NaCl | 13.0 |
| $Na_2CO_3$ | 22.6 |
| Water | 64.4 |

This is cooled to 30–35° C. and is subjected to the action of $CO_2$ gas in a carbonating tower 12, of well known type. This results in precipitation of the major part of the remaining $Na_2CO_3$ as $NaHCO_3$, the latter being insoluble in a strong brine of NaCl. The sodium bicarbonate is filtered off in filter 13 and may then be calcined in well known fashion in a furnace 14, for production of soda ash and $CO_2$ gas which latter is reused in the carbonating tower 12. Losses of $CO_2$ gas are made up from any suitable source. The sodium carbonate mono hydrate from the evaporators 10 may be washed free of mother liquor in a washer 15, and calcined to soda ash in a furnace 16. In this manner I am able to produce about 86% of the total alkai in the raw brine as a very pure soda ash. If caustic soda is the desired product, both the sodium carbonate mono hydrate and the sodium bicarbonate are preferably dissolved in boiling water, and then causticized in the usual manner.

The clear liquor from filter 13 contains all of the salt, bromine, etc., of the raw brine and may be treated by well known means for the recovery of both salt and bromine.

Having thus described my invention, what I claim and desire to secure by Letters Patent is—

1. A process for treating natural brine of the described nature for recovery of its alkali content in commercially pure form, which consists of concentrating and crystallizing out at a temperature approximating the boiling point of water a portion of its contained alkali as sodium carbonate mono hydrate until the mother liquor is a strongly concentrated solution with respect to both sodium carbonate and sodium chloride, and then carbonating the mother liquor for production of the major part of the remaining alkali as sodium bicarbonate.

2. A process for treating natural brine of the character described, containing mostly sodium carbonate, with lesser amounts of sodium chloride and minor amounts of sodium bicarbonate and other compounds for recovery of its contained alkali in pure form as sodium carbonate mono hydrate and sodium bicarbonate, which consists in evaporating by artificial heat so as to salt out sodium carbonate mono hydrate until the mother liquor is substantially saturated with reference to sodium chloride, removing the sodium carbonate mono hydrate from the mother liquor, and cooling the latter, and then treating it with carbon dioxide gas to precipitate the major part of the remaining sodium carbonate as sodium bicarbonate.

ROSS CUMMINGS.